[12] United States Patent  
Gillespie

(10) Patent No.: US 7,836,022 B2  
(45) Date of Patent: Nov. 16, 2010

(54) REDUCTION OF JOIN OPERATIONS WHEN ARCHIVING RELATED DATABASE TABLES

(75) Inventor: Allan E. Gillespie, Danville, CA (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 11/250,095

(22) Filed: Oct. 12, 2005

(65) Prior Publication Data
US 2007/0083573 A1   Apr. 12, 2007

(51) Int. Cl.
G06F 12/00   (2006.01)
(52) U.S. Cl. .......................... 707/661; 707/667; 707/673
(58) Field of Classification Search .................. 707/204, 707/2, 3, 661, 667, 673; 711/1; 717/122
See application file for complete search history.

(56) References Cited

U.S. PATENT DOCUMENTS

| 6,615,206 B1 | 9/2003 | Jakobsson et al. |
| 6,850,927 B1 | 2/2005 | Hsu |
| 6,934,252 B2 | 8/2005 | Mehrotra et al. |
| 2006/0173813 A1* | 8/2006 | Zorola ............................ 707/2 |
| 2006/0206866 A1* | 9/2006 | Eldrige et al. ................ 717/122 |
| 2006/0271528 A1* | 11/2006 | Gorelik .......................... 707/3 |

OTHER PUBLICATIONS

Fusheng Wang, Carlo Zaniolo, Xin Zhou, archis: an xml based approach to transaction time temporal database systems, Sep. 17, 2007 ACM, VLDB Journal 2008, pp. 1445-1463.*
Dimidis Spinellis, working with unix tools, IEEE, 2005, pp. 1-4.*
MYSQL query multiple counts from a child table, Jan. 20, 2009, pp. 1-4.*

* cited by examiner

*Primary Examiner*—Mohammad Ali
*Assistant Examiner*—Donald Lawson
(74) *Attorney, Agent, or Firm*—Janaki K. Davda; Konrad Raynes & Victor LLP

(57) ABSTRACT

Provided are techniques for receiving a request to archive a child table. In response to receiving the request, a join operation is performed on the child table and parent archive data to create child archive data.

12 Claims, 5 Drawing Sheets

REDUCTION OF JOIN OPERATIONS WHEN ARCHIVING RELATED DATABASE TABLES

BACKGROUND

1. Field

Embodiments of the invention relate to reduction of join operations when archiving related database tables.

2. Description of the Related Art

Relational DataBase Management System (RDBMS) software uses relational techniques for storing and retrieving data in a relational database. Relational databases are computerized information storage and retrieval systems. Relational databases are organized into tables that consist of rows and columns of data. The rows may be called tuples or records or rows. A database typically has many tables, and each table typically has multiple records and multiple columns. A RDBMS may use a Structured Query Language (SQL) interface.

A table in a database may be accessed using an index. An index is an ordered set of references (e.g., pointers) to the records in the table. The index is used to access each record in the table using a key (i.e., one of the fields or attributes of the record, which corresponds to a column). The term "key" may also be referred to as "index key". Without an index, finding a record requires a scan (e.g., linearly) of an entire table. Indexes provide an alternate technique to accessing data in a table. Users may create indexes on a table after the table is built. An index is based on one or more columns of the table.

A query may be described as a request for information from a database based on specific conditions. A query typically includes one or more predicates. A predicate may be described as an element of a search condition that expresses or implies a comparison operation (e.g., A=3). When a query is received by the RDBMS, the RDBMS executes the query.

A join may be described as an SQL relational operation that allows retrieval of data from two or more tables based on matching column values.

Tables may be archived to reduce the size of the tables by removing data that is old and/or not being accessed anymore. Reduction in size of the tables leads to better overall application performance for applications accessing the tables. Thus, archiving may be described as moving certain data from "original" tables to "archive" tables, so that the data no longer resides in the original tables, but is still available if needed in the archive tables. The typical solution to archiving multiple related tables is, for each table, joining the table being archived to all of the parent tables of that table to ensure the correct rows are being qualified for archival. A parent table may be described as a table that is related to another table (also referred to as a child table) by referential integrity (RI). Referential integrity may be described as a condition that exists when intended references from data in one column of a table to data in another column of the same or a different table are valid. Referential integrity may be enforced by DataBase Management System (DBMS) constraints (System referential integrity) or programmatically within a DBMS application (Application referential integrity). Note that a table may be a parent of one or more tables (i.e., a parent may have multiple children) and a child of one or more tables (i.e., a child may have multiple parents). Unfortunately, this solution requires multi-table database joins. Database joins are very expensive from a resource usage perspective and from a performance perspective.

In conventional systems, when archiving a set of related tables (also referred to as an "archive unit"), an archive unit tree is walked from bottom to top or top to bottom. That is, the archive unit is the set of related tables to be archived, and an archive unit tree may be described as a representation of the related tables in an archive unit. The root table of an archive unit tree is a starting point table. The purpose of the archive unit is to ensure that data being archived is referentially intact. That is, the data being archived is directly or indirectly related to the rows qualified in the starting point table. Rows are qualified based on a predicate provided with a query (also referred to as a statement) requesting the archive. FIG. 1 illustrates an archive unit tree. In FIG. 1, an EMP table 110 is a root table with a WORKDEPT column 112. DEPT table 120 is a child table of the root table, EMP table 110, and is a parent table of the PROJ table 130. The DEPT table 120 includes a DEPTNO column 122. The PROJ table 130 includes a DEPTNO column 132. The EMP table 110 has an associated ARCEMP archive table 114. An archive table (also referred to as an archive target table) may be described as a table that is populated with the rows that are qualified to be archived. The DEPT table 120 has an ARCDEPT archive table 124. The PROJ table 130 has an archive table 134. A connection key may be described as a column in a table that is to be compared against a connection key column in a parent or child table. Conceptually, connection keys are similar to primary and foreign key keys used to relate tables.

As a result of walking the archive tree unit from bottom to top or top to bottom, when tables are archived within the archive tree unit, a JOIN operation is performed between the table to be archived and the parent tables of that table up to the root table in order to qualify the rows to be archived. For example, in FIG. 1, when archiving the PROJ table 130, the PROJ table 130 is joined to the DEPT table 120 through the connection keys DEPTNO 122-DEPTNO 132. Then the DEPT table 120 is joined to the EMP table 110 via the connection keys WORKDEPT 112-DEPTNO 122. The multi-table join processing may be very expensive when there a several levels (i.e., many parent tables between a child table to be archived and the root table) in a branch of the archive unit tree.

The following Statements (1), (2), and (3) illustrate the processing to archive the PROJ table 130.

Statement (1) is a sample statement that selects rows from the EMP table 110 for which the WORKDEPT column 112 has a value of D11.

Statement (1)
```
SELECT A."EMPNO" FROM "DSN8810"."EMP" A
WHERE (WORKDEPT = 'D11')
```

Statement (2) is a sample statement that selects a DEPTNO column 122 value from the DEPT table 120 for each row for which the row is in the result set of Statement (1), and the DEPTNO column 122 value equals the WORKDEPT column 112 value. Statement (2) requires a join between the EMP table 110 and the DEPT table 120.

Statement (2)
```
SELECT A."DEPTNO" FROM "DSN8810"."DEPT" A
WHERE EXISTS (SELECT 1 FROM "DSN8810"."DEPT" B,
"DSN8810"."EMP"
WHERE (WORKDEPT = 'D11')
AND B."DEPTNO" = "DSN8810"."EMP"."WORKDEPT"
AND A."DEPTNO" = B."DEPTNO")
```

Statement (3) is a sample statement that selects a PROJNO column value (not shown in FIG. 1) and a DEPTNO column 132 value from the PROJ table 130 for each row for which the row is in the result set of Statement (2), the DEPTNO column 132 value equals the DEPTNO column 122 value, the DEPTNO c WORKDEPT column 112 value. Statement (3) requires a join between the PROJ table 130 and the DEPT table 120, and a join between the DEPT table 120 and the EMP table 110.

Statement (3)
```
SELECT A."PROJNO", A."DEPTNO" FROM "DSN8810"."PROJ" A
WHERE EXISTS (SELECT 1 FROM "DSN8810"."PROJ" B,
"DSN8810"."DEPT","DSN8810"."EMP"
WHERE (WORKDEPT = 'D11')
AND B."DEPTNO" = "DSN8810"."DEPT"."DEPTNO"
AND "DSN8810"."DEPT"."DEPTNO" =
"DSN8810"."EMP"."WORKDEPT"
AND A."DEPTNO" = B."DEPTNO")
```

Thus, conventional solutions may require many expensive joins to archive a table, and, therefore, there is a need in the art for improved archiving of tables.

SUMMARY OF EMBODIMENTS OF THE INVENTION

Provided are a method, computer program product, and system for receiving a request to archive a child table. In response to receiving the request, a join operation is performed on the child table and parent archive data to create child archive data.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments avoid performing multi-table join operations when related database tables are being archived. Embodiments walk the related tables from root to leaves, creating archive data for a parent table that is then used to qualify the rows to be archived for a child table of the parent table. The archive data may be stored either in a table or as a file.

Figure 1:
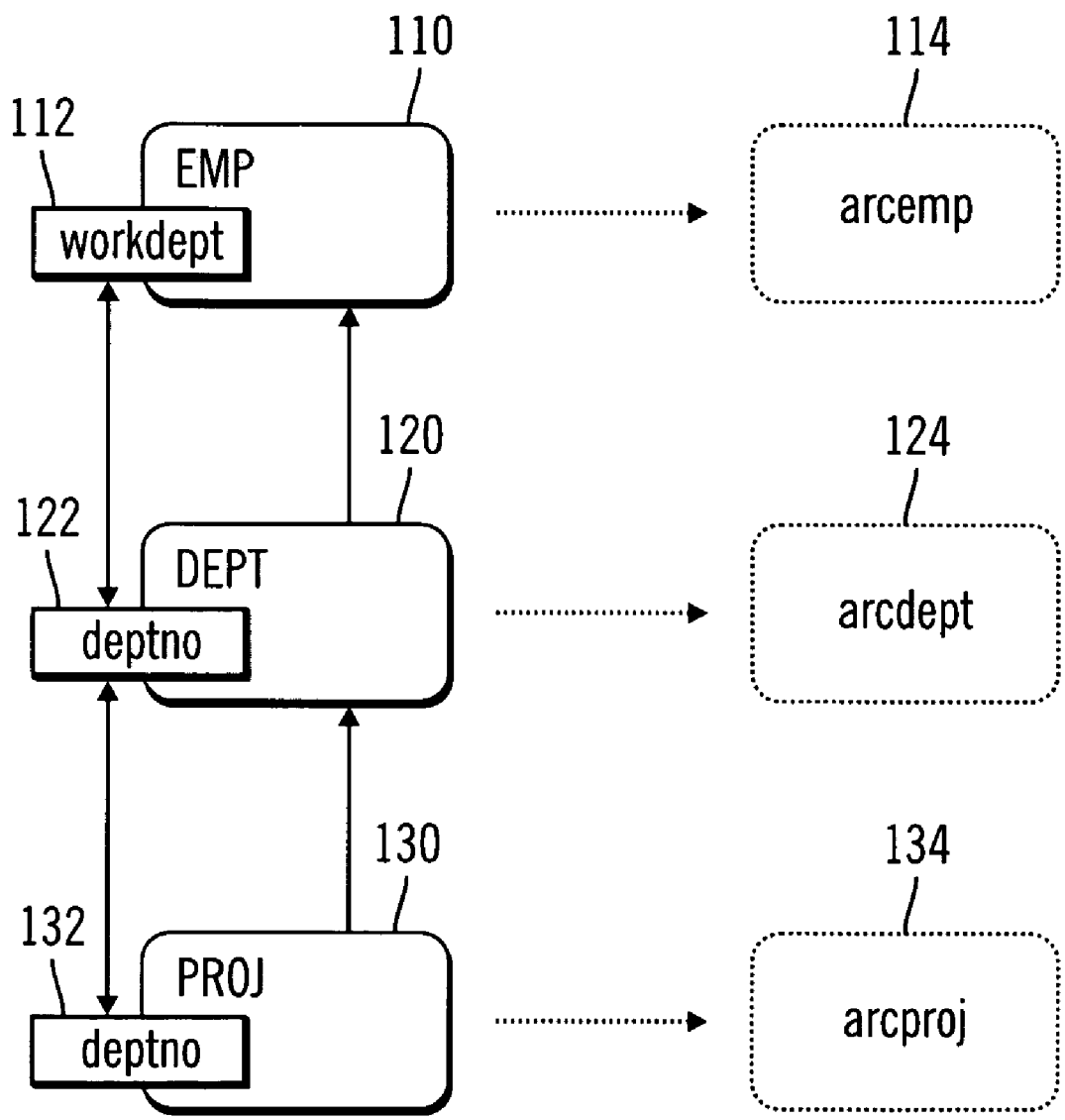
FIG. 1 illustrates an archive unit tree.
Figure 2:
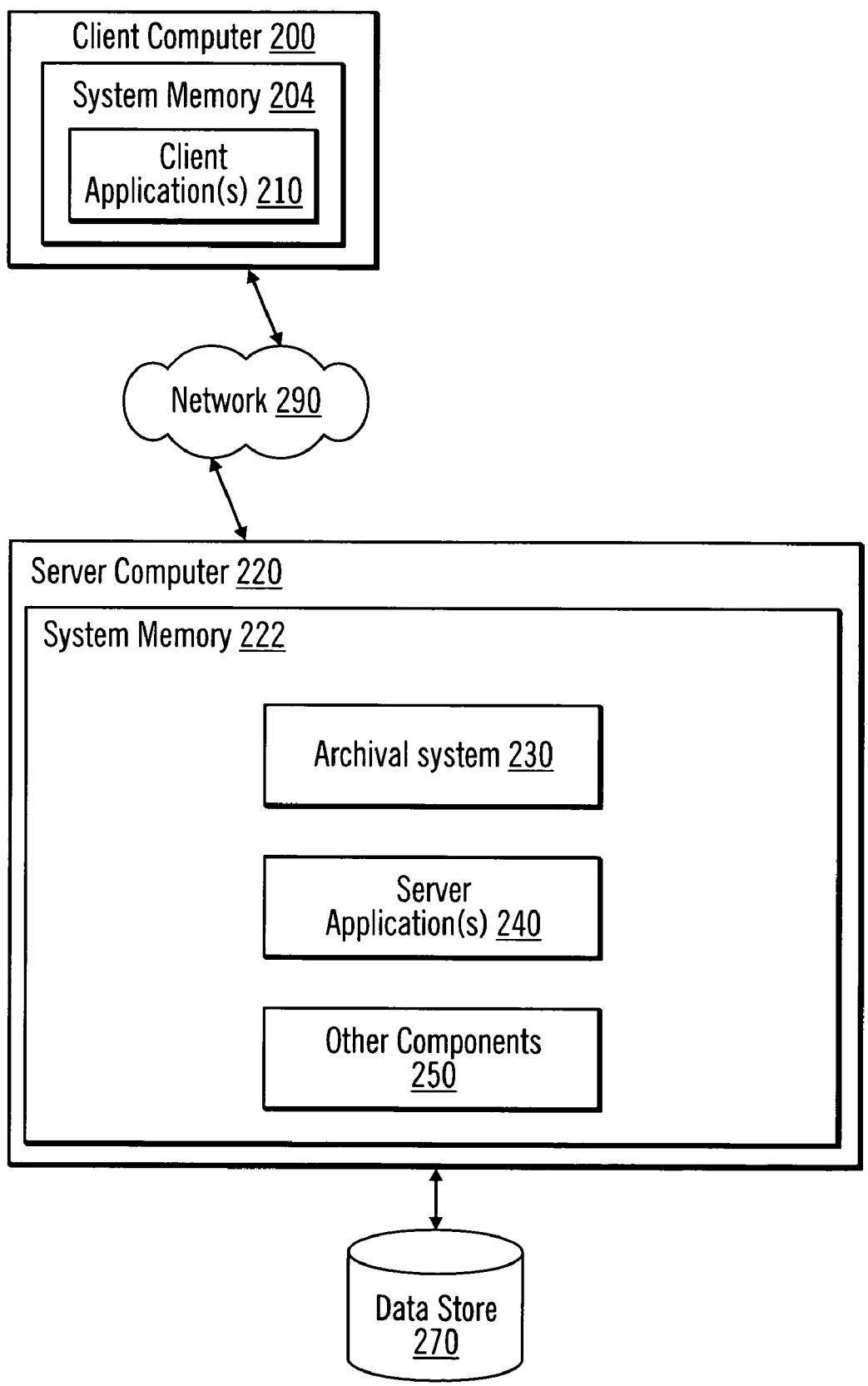
FIG. 2 illustrates details of a computing device in accordance with certain embodiments.

FIG. 2 illustrates details of a computing device in accordance with certain embodiments. A client computer 200 is connected via a network 290 to a server computer 220. The client computer 200 includes system memory 204, which may be implemented in volatile and/or non-volatile devices. One or more client applications 210 (i.e., computer programs) are stored in the system memory 204.

The server computer 220 includes system memory 222, which may be implemented in volatile and/or non-volatile devices. System memory 222 stores an archival system 230 and may include one or more server applications 240 and/or other components 250. The server computer 220 provides the client computer 200 with access to data in a data store 270. Data store 270 may store archived tables and the tables for which the archived tables were created.

In alternative embodiments, the computer programs may be implemented as hardware, software, or a combination of hardware and software.

The client computer 200 and server computer 220 may comprise any computing device known in the art, such as a server, mainframe, workstation, personal computer, hand held computer, laptop telephony device, network appliance, etc.

The network 290 may comprise any type of network, such as, for example, a Storage Area Network (SAN), a Local Area Network (LAN), Wide Area Network (WAN), the Internet, an Intranet, etc.

The data store 270 may comprise an array of storage devices, such as Direct Access Storage Devices (DASDs), Just a Bunch of Disks (JBOD), Redundant Array of Independent Disks (RAID), virtualization device, etc.

Figure 3:
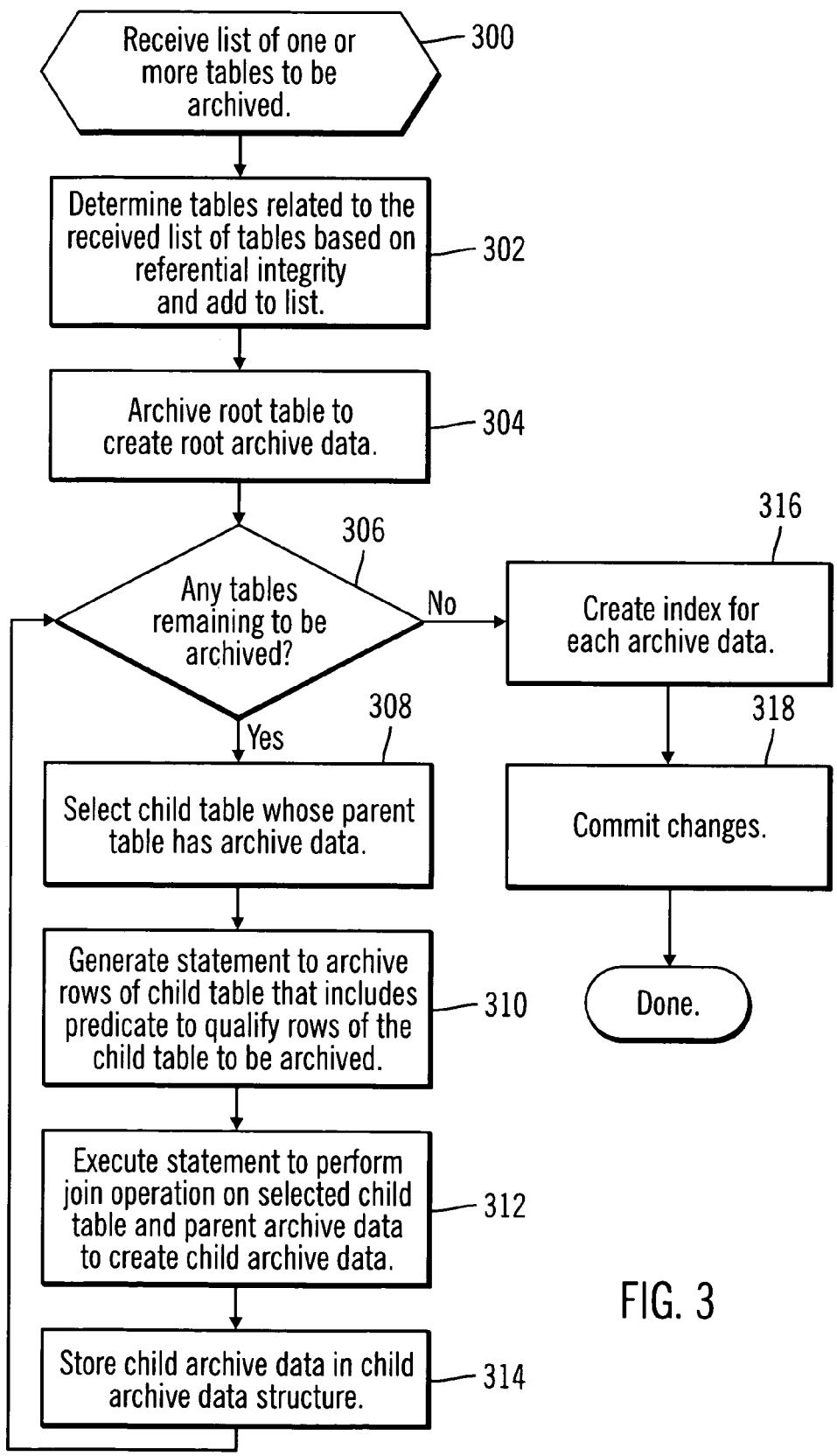
FIG. 3 illustrates logic performed by the archival system in accordance with certain embodiments.

FIG. 3 illustrates logic performed by the archival system 230 in accordance with certain embodiments. Control begins at block 300 with the archival system 230 receiving a list of one or more tables to be archived. In certain embodiments, a user provides the archival system 230 with a list of tables to be archived via a User Interface (UI) provided by the archival system 230. In block 302, the archival system 230 determines tables that are related to the received list of tables based on referential integrity and adds these to the list. In block 304, the archival system 230 archives the root table to create root archive data, which is a parent table to other related tables.

In block 306, the archival system 230 determines whether there are any tables remaining to be archived in the list. If so, processing continues to block 308, otherwise, processing continues to block 316. In block 308, the archival system 230 selects a child table from the list whose parent table has archive data (e.g., the parent table has been archived into a parent archive table or file). Parent archive data may be described as rows archived from a parent table, while child archive data may be described as rows archived from a child table.

In block 310, the archival system 230 generates a statement (e.g., Statement (4)) to archive rows of the child table, and the statement includes a predicate (e.g., PROJ.depno=ARCDEPT.deptno in Statement (4)) to qualify the rows of the child table that are to be archived. That is, the predicate is used to identify the particular rows of the child table to be archived. In certain embodiments, information to generate the predicate may be provided to the archival system 230 by a user via the user interface.

In block 312, the archival system 230 executes the generated statement to perform a join operation on the selected child table and the parent archive data to create child archive data. In particular, the archival system 230 identifies rows based on unique connection key column values using the predicate in the statement. Embodiments use the knowledge that parent archive data has the correct data qualified.

Statement (4) is a sample statement that joins a child table (PROJ) to a parent archive table (ARCDEPT).

```
                                                        Statement (4)
SELECT DISTINCT PROJ.deptno FROM PROJ, ARCDEPT WHERE
    PROJ.deptno = ARCDEPT.deptno
```

Figure 4:
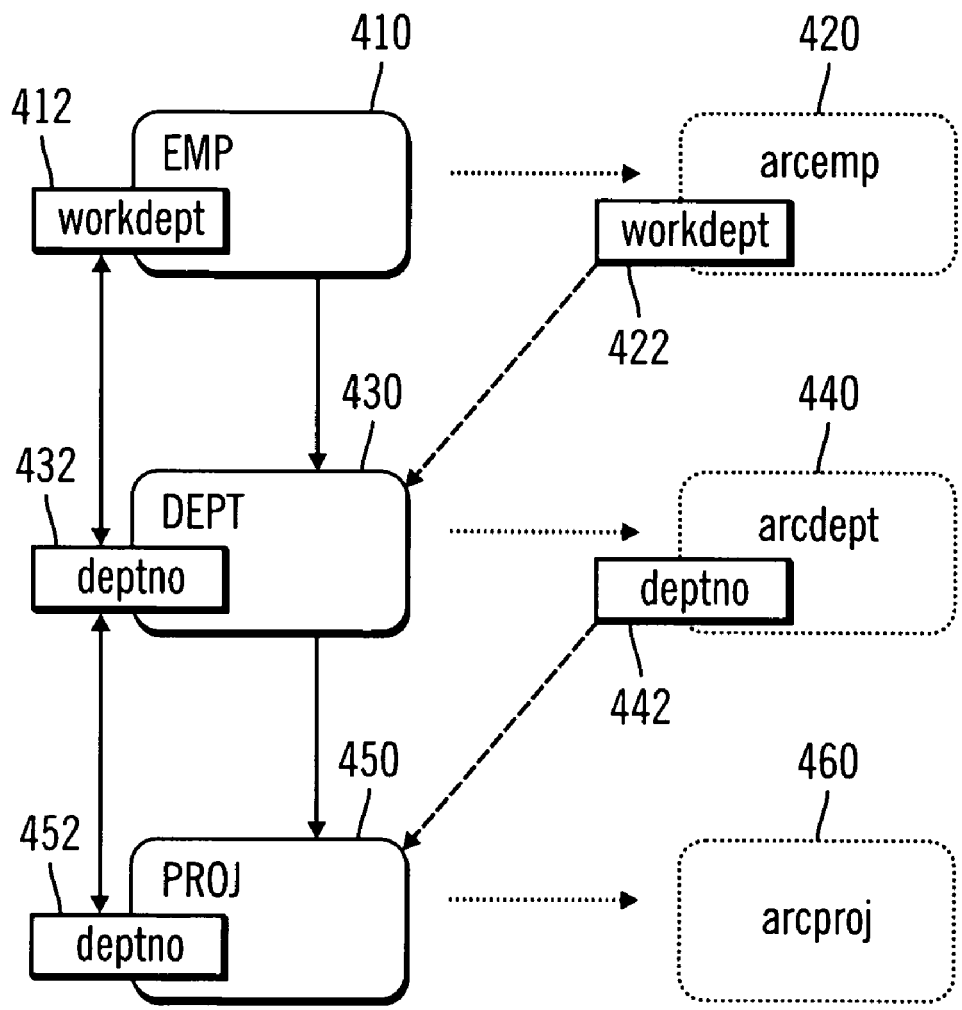
FIG. 4 illustrates an archive unit tree in accordance with certain embodiments.

In block 314, the archival system 230 stores the created child archive data in a child archive data structure. In particular, the archival system 230 inserts the identified rows into a child archive data structure (e.g., a table or file). Statement (5) is a sample statement that inserts rows of a child table to be archived into an archive table. FIG. 4 illustrates an archive unit tree in accordance with certain embodiments. The <value> in Statement (5) refers to a list of parent archive table column values, which in this example are the DEPTNO column 442 values from the ARCDEPT table 440 that qualify the rows in the PROJ table 450 to be inserted into the ARCPROJ table 460, which is a child archive table.

```
                                                        Statement (5)
FOR each row from select distinct
            <value> = PROJ.deptno
        insert into ARCPROJ select from PROJ where Proj.deptno=
<value>
    end
```

From block 314, processing continues to block 306.

In block 316, the archival system 230 creates an index for each archive data (e.g., the root archive data, each parent archive data, and each child archive data). In block 318, the archival system 230 commits changes. Committing changes may be described as releasing locks so that database changes made by that unit of work may be perceived by other processes, and committing makes the data changes permanent.

With the logic of FIG. 3, the archival system 230 walks the archive unit tree from top to bottom and avoids multi-table joins by using parent archive data to qualify the rows of a child table to be archived.

Although examples herein may refer to archive tables, embodiments are applicable to various archive data structures. Again, FIG. 4 illustrates an archive unit tree in accordance with certain embodiments. In the diagram, the root table is EMP table 410, which includes a WORKDEPT column 412 and has an ARCEMP archive table 420 with a corresponding WORKDEPT column 422. A DEPT table 430 is a parent table to a PROJ table 450 and is a child table to EMP table 410. The DEPT table 430 includes a DEPTNO column 432 and has an ARCDEPT archive table 440 with a corresponding DEPTNO column 442. The PROJ table includes a DEPTNO column 452 and has an ARCPROJ archive table 460. The ARCPROJ archive table 460 is created by joining the PROJ table 450 to the ARCDEPT archive table 440. The ARCDEPT archive table 440 is created by joining the DEPT table 430 with the ARCEMP archive table 420. In the example of FIG. 4, the ARCEMP table 420 is a parent archive table for the DEPT table 430, and the ARCDEPT table 440 is a parent archive table for the PROJ table 450.

For example, a row in the PROJ table 450 is archived based on a join between the DEPTNO column 442 in the ARCDEPT archive table 440 and the DEPTNO column 452 in the PROJ table 450. The DEPTNO columns 442, 452 from the tables 440, 450, respectively, are used in the join because they represent the connection key between the DEPT table 430 and the PROJ table 450.

With embodiments, first the EMP table 410 is archived, then the DEPT table 430 is archived, and then the PROJ table 450 is archived.

Statement (6) is a sample statement that selects distinct rows from the EMP table 410 for which the WORKDEPT column 412 has a value of D11.

```
                                                        Statement (6)
SELECT DISTINCT A."EMPNO" FROM "DSN8810"."EMP" A
    WHERE (A."WORKDEPT" = 'D11')
```

Statement (7) is a sample statement that selects a distinct DEPTNO column 432 value from the DEPT table 430 for each row for which the WORKDEPT column value 422 from the ARCEMP archive table 420 equals the DEPTNO column 432 value from the DEPT table 430.

```
                                                        Statement (7)
SELECT DISTINCT A."DEPTNO"
FROM "DSN8810"."DEPT" A, "DAE"."ARCEMP" B
WHERE 1 = 1
AND B."WORKDEPT" = A."DEPTNO"
```

Statement (8) is a sample statement that selects a distinct PROJNO column value (not shown in FIG. 4) and a DEPTNO column 452 value from the PROJ table 450 for which the DEPTNO column 442 value from the ARCDEPT archive table 440 equals the DEPTNO column 452 column value from the PROJ table 450.

```
                                                        Statement (8)
SELECT DISTINCT A."PROJNO", A."DEPTNO"
FROM "DSN8810"."PROJ" A, "DAE"."ARCDEPT" B
WHERE 1 = 1
AND B."DEPTNO" = A."DEPTNO"
```

Thus, when comparing the SELECT Statements (6), (7), and (8) for the PROJ table 450 to the SELECT Statements (1), (2), and (3), it can be seen that embodiments provide a simpler solution, with fewer joins. In particular, one join is used to form the Thus, embodiments avoid multi-table joins and, at most, one join between the table being archived and a parent archive table is performed. Embodiments reduce the need for resources and improve performance so that customers may get more system administration and DBMS administration activities done (e.g., in limited batch processing windows).

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIG. 3 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIG. 3 may be implemented in software, hardware, programmable and non-programmable gate array logic or in some combination of hardware, software, or gate array logic.

Figure 5:
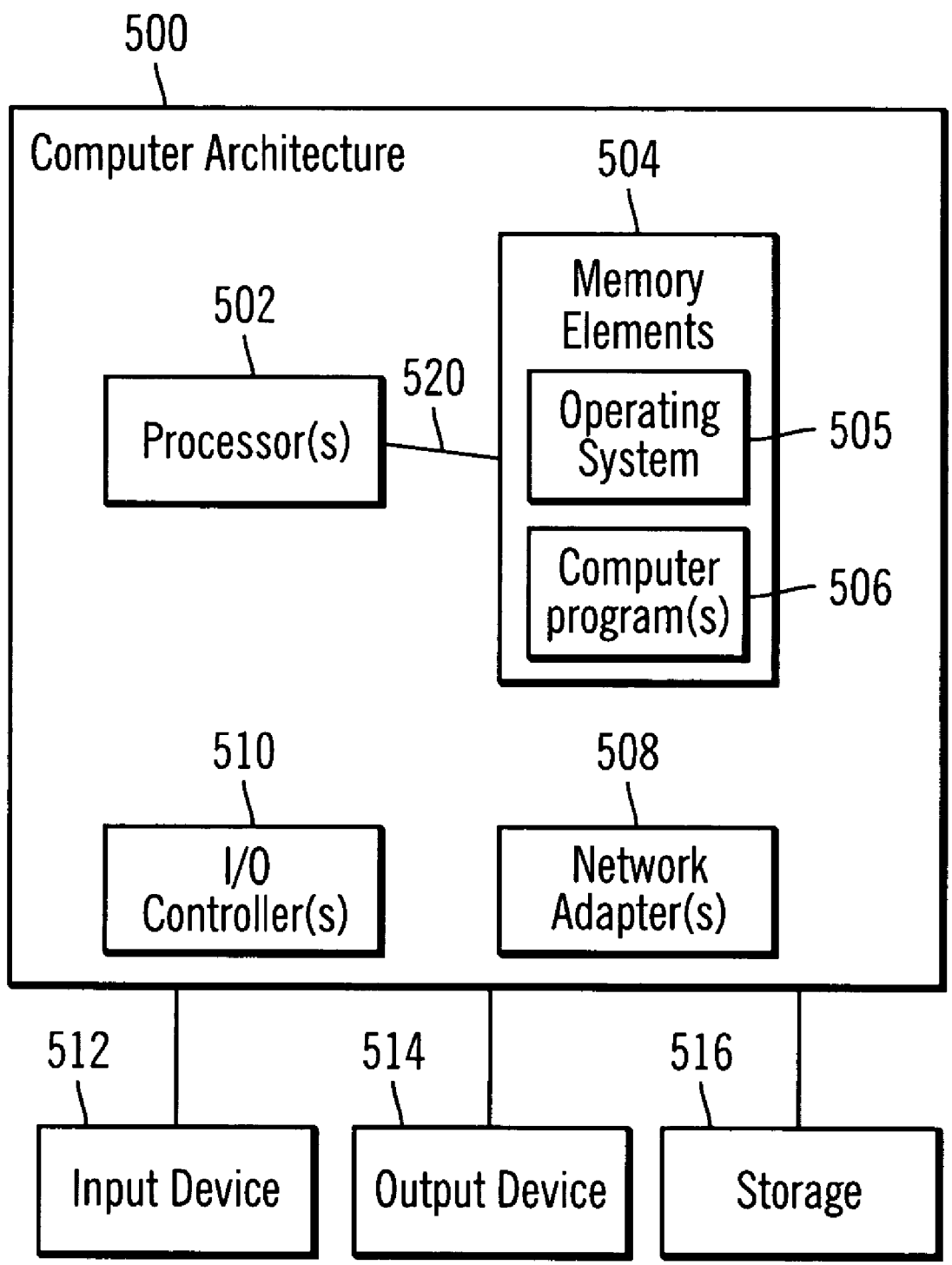
FIG. 5 illustrates an architecture of a computer system that may be used in accordance with certain embodiments.

FIG. 5 illustrates a system architecture 500 that may be used in accordance with certain embodiments. Client computer 200 and/or server computer 220 may implement system architecture 500. The system architecture 500 is suitable for storing and/or executing program code and includes at least one processor 502 coupled directly or indirectly to memory elements 504 through a system bus 520. The memory elements 504 may include local memory employed during actual execution of the program code, bulk storage, and cache memories which provide temporary storage of at least some program code in order to reduce the number of times code must be retrieved from bulk storage during execution. The memory elements 504 include an operating system 505 and one or more computer programs 506.

Input/Output (I/O) devices 512, 514 (including but not limited to keyboards, displays, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks. Modems, cable modem and Ethernet cards are just a few of the currently available types of network adapters 508.

The system architecture 500 may be coupled to storage 516 (e.g., a non-volatile storage area, such as magnetic disk drives, optical disk drives, a tape drive, etc.). The storage 516 may comprise an internal storage device or an attached or network accessible storage. Computer programs 506 in storage 516 may be loaded into the memory elements 504 and executed by a processor 502.

The system architecture 500 may include fewer components than illustrated, additional components not illustrated herein, or some combination of the components illustrated and additional components. The system architecture 500 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A method for archiving data, comprising:
receiving at a computer including a processor a list of tables to be archived, wherein one table is a root table and each other table is a child table, wherein at least one child table has a parent table that is not the root table; and
processing the list by walking an archive unit tree from top to bottom, wherein the archive unit tree represents the list of tables to be archived, and by:

archiving the root table in the list to create parent archive data in a parent archive table, wherein the parent archive data represents data removed from the parent table; and processing each child table in the list by selecting a next child table in the list to be archived whose immediate parent table has already been archived, and for the selected child table:

receiving information to generate a predicate from a user;

generating a statement to perform the join operation that includes the predicate to qualify the rows of the child table that are to be archived; and executing the statement to perform the join operation on the child table and the parent archive table to create child archive data in a child archive table, wherein the child archive table is capable of being a parent archive table for another child table in the list, wherein the parent archive data is used to qualify rows of the child table that are to be moved from the child table into the child archive data, and wherein the join uses columns in the child table and the parent archive table that represent connection keys between the child table and the parent archive table.

2. The method of claim 1, further comprising:
determining tables that are related to the received list of tables based on referential integrity; and
adding the determined tables to the list of tables to be archived.

3. The method of claim 1, further comprising:
storing the child archive data in a child archive data structure.

4. The method of claim 1, further comprising:
creating an index for the child archive data; and
committing changes.

5. A computer program product for archiving data comprising a computer readable storage medium including a computer readable program, wherein the computer readable program when executed by a processor on a computer causes the computer to:

receive a list of tables to be archived, wherein one table is a root table and each other table is a child table, wherein at least one child table has a parent table that is not the root table; and process the list by walking an archive unit tree from top to bottom, wherein the archive unit tree represents the list of tables to be archived, and by:

archiving the root table in the list to create parent archive data in a parent archive table, wherein the parent archive data represents data removed from the parent table; and processing each child table in the list by selecting a next child table in the list to be archived whose immediate parent table has already been archived, and for the selected child table:

receiving information to generate a predicate from a user;

generating a statement to perform the join operation that includes the predicate to qualify the rows of the child table that are to be archived; and executing the statement to perform the join operation on the child table and the parent archive table to create child archive data in a child archive table, wherein the child archive table is capable of being a parent archive table for another child table in the list, wherein the parent archive data is used to qualify rows of the child table that are to be moved from the child table into the child archive data, and wherein the join uses columns in the child table and the parent archive table that represent connection keys between the child table and the parent archive table.

6. The computer program product of claim 5, wherein the computer readable program when executed on a computer causes the computer to:
determine tables that are related to the received list of tables based on referential integrity; and
add the determined tables to the list of tables to be archived.

7. The computer program product of claim 5, wherein the computer readable program when executed on a computer causes the computer to:
store the child archive data in a child archive data structure.

8. The computer program product of claim 5, wherein the computer readable program when executed on a computer causes the computer to:
create an index for the child archive data; and
commit changes.

9. A system for archiving data, comprising:
a processor; and
hardware logic performing operations, the operations comprising:

receiving at a computer including a processor a list of tables to be archived, wherein one table is a root table and each other table is a child table, wherein at least one child table has a parent table that is not the root table; and processing the list by walking an archive unit tree from top to bottom, wherein the archive unit tree represents the list of tables to be archived, and by:

archiving the root table in the list to create parent archive data in a parent archive table, wherein the parent archive data represents data removed from the parent table; and processing each child table in the list by selecting a next child table in the list to be archived whose immediate parent table has already been archived, and for the selected child table:

receiving information to generate a predicate from a user;

generating a statement to perform the join operation that includes the predicate to qualify the rows of the child table that are to be archived; and executing the statement to perform the join operation on the child table and the parent archive table to create child archive data in a child archive table, wherein the child archive table is capable of being a parent archive table for another child table in the list, wherein the parent archive data is used to qualify rows of the child table that are to be moved from the child table into the child archive data, and wherein the join uses columns in the child table and the parent archive table that represent connection keys between the child table and the parent archive table.

10. The system of claim 9, wherein the operations further comprise:
determining tables that are related to the received list of tables based on referential integrity; and
adding the determined tables to the list of tables to be archived.

11. The system of claim 9, wherein the operations further comprise:

storing the child archive data in a child archive data structure.

12. The system of claim 9, wherein the operations further comprise:

creating an index for the child archive data; and
committing changes.

* * * * *